(12) United States Patent
Sato et al.

(10) Patent No.: US 7,585,918 B2
(45) Date of Patent: Sep. 8, 2009

(54) BLOCK POLYMER COMPOUND, POLYMER-CONTAINING COMPOSITION THAT CONTAINS THE SAME

(75) Inventors: Koichi Sato, Atsugi (JP); Ikuo Nakazawa, Kawasaki (JP); Sakae Suda, Yokohama (JP); Ryuji Higashi, Kawasaki (JP); Masayuki Ikegami, Atsugi (JP); Keiichiro Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 10/568,070

(22) PCT Filed: Sep. 30, 2004

(86) PCT No.: PCT/JP2004/014798

§ 371 (c)(1),
(2), (4) Date: Feb. 13, 2006

(87) PCT Pub. No.: WO2005/033160

PCT Pub. Date: Apr. 14, 2005

(65) Prior Publication Data

US 2006/0281870 A1 Dec. 14, 2006

(30) Foreign Application Priority Data

Oct. 3, 2003 (JP) .............................. 2003-345828

(51) Int. Cl.
C08F 293/00 (2006.01)
C08F 297/02 (2006.01)

(52) U.S. Cl. ........................... 525/242; 525/93; 525/94; 526/320; 526/326; 526/333; 526/334; 526/335

(58) Field of Classification Search .................. 525/242, 525/93, 94; 523/160; 526/320, 326, 333, 526/335, 334

See application file for complete search history.

(56) References Cited

U.S. PATENT DOCUMENTS

| 5,085,698 | A | 2/1992 | Ma et al. |
| 5,221,334 | A | 6/1993 | Ma et al. .................... 524/167 |
| 5,272,201 | A | 12/1993 | Ma et al. .................... 524/505 |
| 6,306,994 | B1 | 10/2001 | Donald et al. ............ 526/317.1 |
| 6,899,823 | B2 | 5/2005 | Sato et al. |
| 6,953,642 | B2 | 10/2005 | Yamamoto et al. |
| 2003/0232904 | A1 | 12/2003 | Sato et al. |
| 2005/0037160 | A1* | 2/2005 | Suda et al. ................ 428/32.34 |
| 2005/0196678 | A1 | 9/2005 | Yamamoto et al. |
| 2006/0079603 | A1 | 4/2006 | Sato et al. |
| 2006/0244800 | A1 | 11/2006 | Nakazawa et al. |

FOREIGN PATENT DOCUMENTS

| EP | 0 509 109 A1 | 10/1992 |
| JP | 11080221 A | 3/1999 |
| JP | 11322866 A | 11/1999 |
| JP | 11322942 A | 11/1999 |
| WO | WO 03/074575 A1 | 9/2003 |
| WO | WO 03/074609 | * 9/2003 |

OTHER PUBLICATIONS

Sadahito Aoshima et al., "Living Cationic Polymerization of Vinyl Monomers by Organoaluminium Halides: 1. EtAlCl2/ Ester Initiating Systems for living Polymerization of Vinyl Ethers," 15 Polymer Bulletin 417-23 (1986).

* cited by examiner

Primary Examiner—Irina S Zemel
(74) Attorney, Agent, or Firm—Fitzpatrick, Cella, Harper & Scinto

(57) ABSTRACT

A block polymer compound containing block segments, characterized in that at least one hydrophilic segment among the block segments is a copolymer segment composed of an ionic or hydrophilic repeating unit structure and a hydrophobic repeating unit structure.

4 Claims, 1 Drawing Sheet

BLOCK POLYMER COMPOUND, POLYMER-CONTAINING COMPOSITION THAT CONTAINS THE SAME

TECHNICAL FIELD

The present invention relates to a novel block polymer compound useful as various kinds of functional materials, a polymer-containing composition that contains the same, and an image-forming method and image-forming apparatus using the same.

BACKGROUND ART

In aqueous dispersing materials that contain functional material, the functional materials have been conventionally well known in the art, which include: agricultural chemicals such as herbicides and insecticides; pharmaceuticals such as anticancer agents, antiallergy agents, and antiphlogistic agents; and coloring materials such as ink and toner that contain colorants. In recent years, digital printing technologies have very rapidly progressed and the representative examples of the digital printing technologies include the so-called electrophotographic and inkjet technologies. The technologies, such as image-forming technologies for the office, home, and other uses have further increased their raison d'etre.

Among the technologies, the ink-jet technology as a direct recording method has prominent characteristic features of compactness and low power consumption. In addition, the image quality has rapidly increased with the advances in the micro-fabrication of nozzles. One example of the ink-jet technologies is a method in which ink supplied from an ink tank is vaporized and bubbled by heating with a heater in a nozzle to discharge ink to form an image on a recording medium. Another example is a method in which ink is discharged from a nozzle by vibrating a piezo-electric element.

The ink used in those methods is typically an aqueous dye solution, so that the ink may run on a recording medium when colors are superimposed thereon or a phenomenon referred to as feathering may occur on a recording area of the recording medium in the direction of paper fibers. For alleviating this problem, U.S. Pat. No. 5,085,698 discloses the use of pigment-dispersion ink. However, many improvements are still desired.

DISCLOSURE OF THE INVENTION

The present invention is intended to provide a block polymer compound capable of dispersing a functional substance in a solvent.

The present invention is also intended to provide a polymer-containing composition that contains the block polymer compound, which has excellent dispersibility, fixing ability, and environmental resistance.

According to a first aspect of the present invention, there is provided a block polymer compound, containing block segments, characterized in that at least one hydrophilic block segment among the block segments is a copolymer segment composed of an ionic or hydrophilic repeating unit structure and a hydrophobic repeating unit structure.

According to a second aspect of the present invention, there is provided a polymer-containing composition, containing the block copolymer compound, a solvent or a dispersion medium, and a functional substance.

According to a third aspect of the present invention, there is provided an image-forming method including applying ink containing the composition onto a recording medium to carry out recording.

According to a fourth aspect of the present invention, there is provided an image-forming apparatus including: an applying means for applying ink containing the composition on a recording medium; and a driving means for controlling the applying means.

BEST MODE FOR CARRYING OUT THE INVENTION

Figure 1:
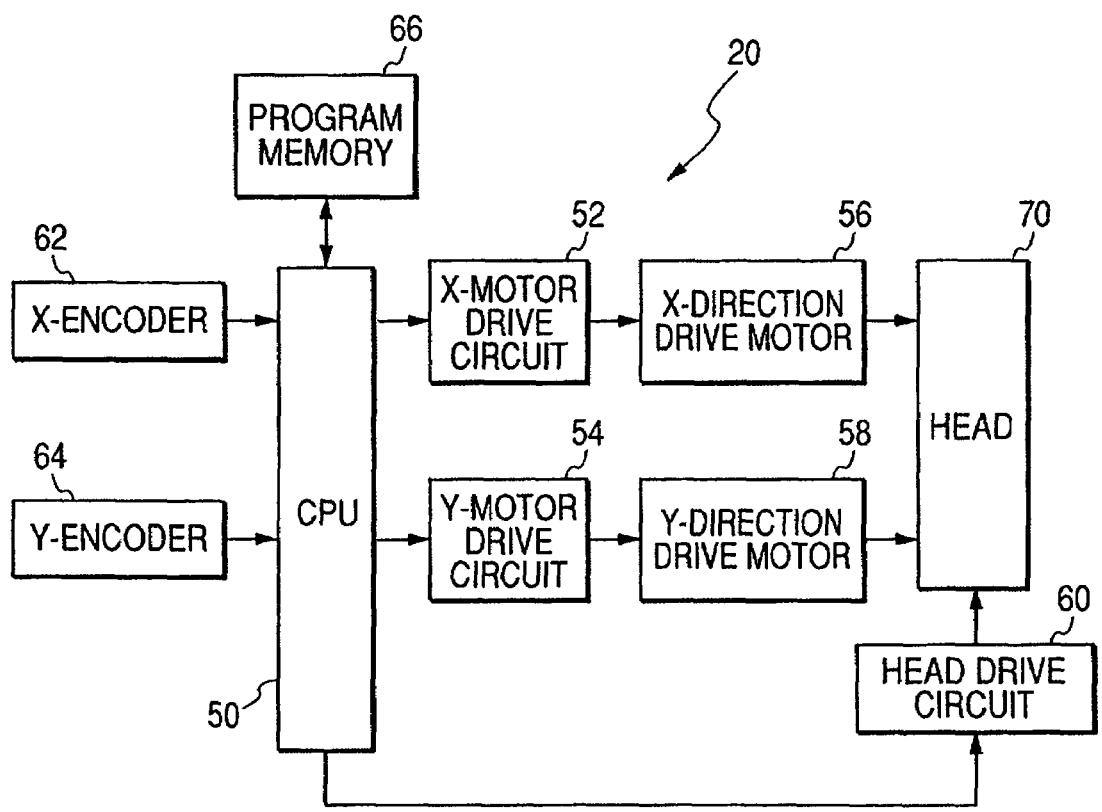
FIG. 1 is a block diagram showing the configuration of an ink-jet recording apparatus.

The inventors of the present invention have completed the present invention as a result of their extensive study.

According to the first aspect of the present invention, there is provided a block polymer compound composed of block segments, characterized in that at least one hydrophilic block segment of the block segments is a copolymer segment composed of an ionic or hydrophilic repeating unit structure and a hydrophobic repeating unit structure. Preferably, the block copolymer compound contains 50 mol % or more of the ionic repeating unit structure and 50 mol % or less of the hydrophobic repeating unit structure in the hydrophilic segment. Furthermore, the content of the ionic repeating unit structure is preferably 70 mol % or more, more preferably 80 mol % or more. In one of the preferable embodiments, the content of the ionic repeating unit structure is 90 mol % or more. The term "block polymer" used herein is also referred to as "block copolymer", so that any of these designations may be used.

In terms of favorable dispersion stability and also in terms of easiness in formation of a polymer micelle and easiness in incorporation of a functional substance described later in the polymer micelle, preferably, the block polymer compound is an amphipathic block polymer compound, characterized in that at least one block segment is composed of the hydrophobic repeating unit structure and the hydrophilic repeating unit structure and has hydrophilic properties, and the hydrophilic repeating unit in the at least one block segment has an ionic group or an acidic group. More preferably, the block polymer compound is a block polymer compound, characterized in that the above-mentioned ionic group or acidic group is at least one functional group selected from carboxylic acid and carboxylate. Furthermore, a block copolymer containing a repeating unit of a polyalkenyl ether is preferable in the present invention, and of course, the present invention includes a block copolymer not composed of a repeating unit of polyalkenyl ether, such as an acrylic, methacrylic, styrylic, or polyoxyalkylene block copolymer. According to the present invention, there is provided an amphipathic block copolymer compound having at least one hydrophilic segment and at least one hydrophobic segment, in which the hydrophilic segment is a block segment containing an ionic repeating unit structure and a hydrophobic repeating unit structure. In particular, when the composition is used as a dispersion composition as described later, it is possible to impart favorable dispersibility with high stability to the dispersion composition and to realize favorable driving characteristics of various kinds of recording devices.

The repeating unit structure having the ionic group or the acidic group is preferably selected from repeating units represented by the following general formula (1):

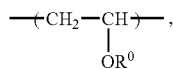

wherein $R^0$ represents —X—(COOH)$_r$ or —X—(COO—M)$_r$; X represents a linear, branched, or cyclic alkylene group having 1 to 20 carbon atoms, or —(CH(R5)-CH(R6)-O)$_p$—(CH$_2$)$_m$—CH$_3$-r- or —(CH$_2$)$_m$—(O)$_n$—(CH$_2$)$_q$—CH$_3$-r- or a substituted structure of these groups in which at least one of methylene groups is substituted by a carbonyl group or an aromatic ring group; r represents 1 or 2; p represents an integral number of 1 to 18; m represents an integer of 0 to 35; n represents 0 or 1; q represents an integer of 0 to 17; M represents a monovalent or polyvalent cation; and each of R5 and R6 represents an alkyl group, where R5 and R6 may be the same as or different from each other).

Specific examples of the repeating unit structures represented by the general formula (1) include the following repeating unit structures (Ph represents a phenylene group).

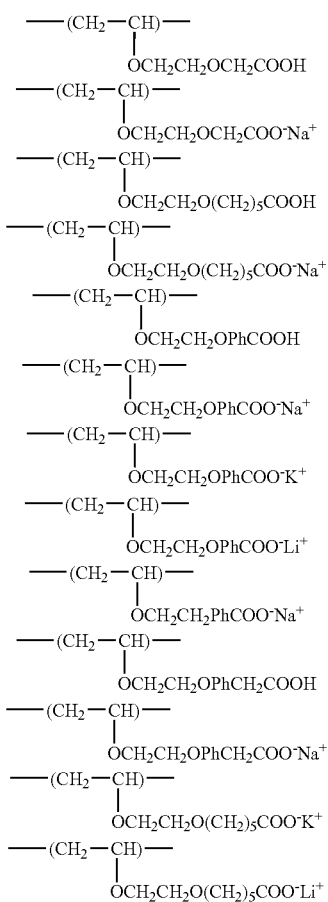

The above-mentioned at least one block segment is composed of the hydrophobic repeating unit structure and the hydrophilic repeating unit structure and has hydrophilic properties. The hydrophobic repeating unit used in the block segment is preferably selected from repeating unit structures represented by the following general formula (2):

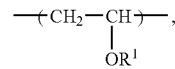

wherein $R^1$ is selected from the group consisting of a linear, branched, or cyclic alkyl group having 1 to 18 carbon atoms, —Ph, —Pyr, —Ph—Ph, —Ph—Pyr, —(CH(R5)-CH(R6)-O)$_p$—R7, and —(CH$_2$)$_m$—(O)$_n$—R7, where a hydrogen atom in an aromatic ring of these groups may be substituted by a linear or branched alkyl group having 1 to 4 carbon atoms and a carbon atom in the aromatic ring may be substituted by a nitrogen atom;

p represents an integer of 1 to 18; m represents an integer of 1 to 36; n represents 0 or 1;

each of R5 and R6 independently represents a hydrogen atom or —CH$_3$;

R7 represents a hydrogen atom, a linear, branched, or cyclic alkyl group having 1 to 18 carbon atoms, —Ph, —Pyr, —Ph—Ph, —Ph—Pyr, —CHO, —CH$_2$CHO, —CO—CH=CH$_2$, —CO—C(CH$_3$)=CH$_2$, or —CH$_2$COOR8, where when R7 is not a hydrogen atom, a hydrogen atom bound to a carbon atom of R7 may be substituted by a linear or branched alkyl group having 1 to 4 carbon atoms or —F, —Cl, or —Br, where a carbon atom in an aromatic ring of these groups may be substituted by a nitrogen atom; R8 represents a hydrogen atom or an alkyl group having 1 to 5 carbon atoms; Ph represents a phenyl group; and Pyr represents a pyridyl group).

Specific examples of the repeating unit structures represented by the general formula (2) include the following repeating unit structures (Ph represents a phenylene group or a phenyl group).

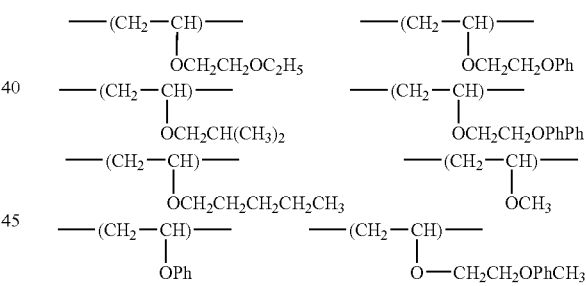

As described above, preferably, the block copolymer compound of the present invention is amphipathic and has the hydrophilic segment described above. Therefore, the block copolymer compound of the present invention also has a hydrophobic segment as an amphipathic block copolymer. The hydrophobic segment is preferably a hydrophobic segment having a repeating unit structure selected from repeating unit structures represented by the following general formula (3):

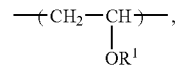

wherein R1 is selected from the group consisting of a linear, branched, or cyclic alkyl group having 1 to 18 carbon atoms, —Ph, —Pyr, —Ph—Ph, —Ph—Pyr, —(CH(R5)-CH(R6)-

$O)_p$—R7, and —$(CH_2)_m$—$(O)_n$—R7, where a hydrogen atom in an aromatic ring of these groups may be substituted by a linear or branched alkyl group having 1 to 4 carbon atoms, and a carbon atom in the aromatic ring may be substituted by a nitrogen atom;

p represents an integer of 1 to 18; m represents an integer of 1 to 36; n represents 0 or 1;

each of R5 and R6 independently represents a hydrogen atom or —$CH_3$;

R7 represents a hydrogen atom, a linear, branched, or cyclic alkyl group having 1 to 18 carbon atoms, —Ph, —Pyr, —Ph—Ph, —Ph—Pyr, —CHO, —$CH_2$CHO, —CO—CH=$CH_2$, —CO—C($CH_3$)=$CH_2$, or —$CH_2$COOR8, where when R7 is not a hydrogen atom, a hydrogen atom bound to a carbon atom of R7 may be substituted by a linear or branched alkyl group having 1 to 4 carbon atoms or —F, —Cl, or —Br, where a carbon atom in an aromatic ring of these groups may be substituted by a nitrogen atom; R8 represents a hydrogen atom or an alkyl group having 1 to 5 carbon atoms; Ph represents a phenyl group; and Pyr represents a pyridyl group.

Specific examples of the repeating unit structures represented by the general formula (3) include the following repeating unit structures, and may include a copolymerization block segment or a copolymerization block segment having two or more kinds of the following repeating units:

(Ph represents a phenylene group or a phenyl group)

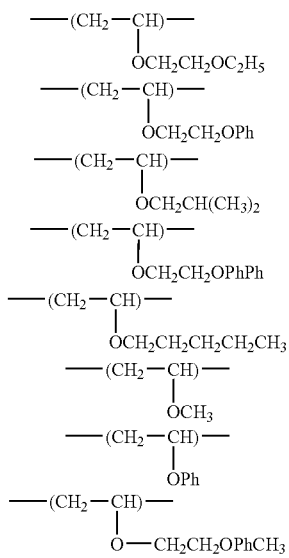

A more preferable embodiment with respect to the amphipathic block copolymer in the present invention is a triblock copolymer. The triblock copolymer contains another segment in addition to the hydrophilic and hydrophobic segments exemplified above. Preferable examples of the additional segment include following:

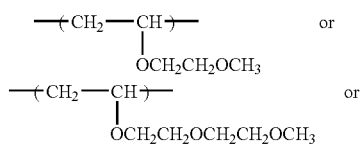

-continued

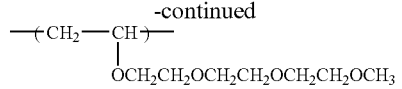

In the present invention, the content of a block segment, which is a copolymer segment composed of the hydrophobic repeating unit structure and the hydrophilic repeating unit structure and has hydrophilic properties, in a block copolymer compound is preferably 1 mol % or more, but less than 99 mol %, more preferably 3 mol % or more, but less than 95 mol %, still more preferably 3 mol % or more, but less than 70% or 50 mol % or less. If the block segment content is less than 1 mol %, the dispersion stability may be insufficient. If the content of the block segment is 99 mol % or more, the viscosity may increase too much. In addition, the content of the hydrophilic repeating unit structure in the block segment is preferably 10 mol % or more, but less than 99 mol %. If the content of the hydrophilic repeating unit structure is less than 10 mol %, the hydrophilic properties may be insufficient for the segment. If the content of the hydrophilic repeating unit structure exceeds 99 mol %, the proportion of the hydrophobic repeating unit to the hydrophilic one is less than 1 mol %, and the effects of the hydrophobic repeating unit may be insufficient. One of the effects of the hydrophobic unit as a minor component mixed in the hydrophilic segment may be particularly responsible for maintaining favorable ionic dissociation conditions of the ionic unit. This fact may relate to the possibility of making the recording performance of an ink-jet technology favorable in terms of dispersion stability and viscosity.

Furthermore, the content of the hydrophilic segment used in the present invention in the block copolymer is preferably 1 mol % or more, but less than 99 mol %. If the content of the hydrophobic segment is less than 1 mol %, the dispersion stability may be insufficient. If the content of the hydrophilic segment is 99 mol % or more, the viscosity may increase too much.

The number average molecular weight (Mn) of the block polymer compound of the present invention is in the range of 200 or more and 10,000,000 or less, more preferably in the range of 1,000 or more and 1,000,000 or less. If Mn exceeds 10,000,000, the number of intra- or inter-polymer chains tangled is too large and the block copolymer compound may be hardly dispersed in the solvent. If Mn is less than 200, the block copolymer compound may have difficulty in exerting its steric effect as a polymer because of its small molecular weight. The degree of polymerization for each block segment is preferably in the range of 3 or more and 10,000 or less, more preferably in the range of 5 or more and 5,000 or less, still more preferably in the range of 10 or more to 4,000 or less.

In addition, for improving the dispersion stability and inclusion property (intentionality), the molecular motility of a block polymer is preferably flexible. This is because the flexible molecular motility of the block polymer allows the block polymer to be physically tangled with and easily have an affinity to the surface of a functional substance. Furthermore, as described later, the molecular motility is preferably flexible also in terms of easily forming a coating layer on a recording medium. For this end, the glass transition temperature Tg of the main chain of the block polymer is preferably 20° C. or less, more preferably 0° C. or less, still more preferably −20° C. or less. In this regard, a polymer having a polyvinyl ether structure is more preferable because it has a lower glass transition temperature in general and is flexible.

Most exemplified repeating unit structures have glass transition temperatures of −20° C. or less.

The block polymer compound having a polyvinyl ether repeating unit structure, which is preferably used in the present invention, is mainly polymerized by means of cationic polymerization. Initiators for the polymerization include: proton acids, such as hydrochloric acid, sulfuric acid, methanesulfonic acid, trifluoroacetic acid, trifluoromethane sulfonic acid, and perchloric acid; and combinations of Lewis acids, such as $BF_3$, $AlCl_3$, $TiCl_4$, $SnCl_4$, $FeCl_3$, $RAlCl_2$, and $R_{1.5}AlCl_{1.5}$ (R represents an alkyl) with cation sources (cationic sources include a proton acid, water, alcohol, vinyl ether, and an adduct of carboxylic acid). Any one of those initiators is allowed to coexist with a polymerizable compound (monomer) to advance a polymerization reaction, thereby resulting in a block polymer compound. More preferably, the block polymer compound having a polyvinyl ether repeating unit structure used in the present invention contains a polyvinyl ether repeating unit structure in an amount of 90 mol % or more.

A polymerization method preferably used in the present invention is described. below A large number of processes for synthesis of a polymer that contains a polyvinyl ether structure have been reported (Japanese Patent Application Laid-Open No. H11-080221). Of those, the representative is a method by means of cationic living polymerization by Aoshima et al. (Journal of Polymer Bulletin, vol. 15, p. 417, 1986, Japanese Patent Application Laid-Open No. H11-322942, and Japanese Patent Application Laid-Open No. H11-322866). The polymer synthesis with cationic living polymerization allows the formation of various kinds of polymers, such as a homopolymer, a copolymer composed of two or more kinds of monomers, a block polymer, a graft polymer, and a graduation polymer, while the length (molecular weight) of the polymer is precisely determined. In addition, the living polymerization can be also performed by using an $HI/I_2$- or $HCl/SnCl_4$-system.

The second aspect of the present invention is described below.

According to the second aspect of the present invention, there is provided a polymer-containing composition that contains the block polymer compound described above, a solvent or a dispersion medium, and a functional substance. In other words, the polymer-containing composition contains the block polymer compound described above and the functional substance, such as a coloring material, which performs a predetermined useful function. Thus, the block polymer compound is suitably used for favorably dispersing the functional substance or the like. The functional substance is preferably in the form of a liquid or solid, and may be a soluble substance, such as oil, a pigment, a metal, a herbicide, an insecticide, a biomaterial, a medicine, a dye, or a molecular catalyst. In the present invention, a coloring material is preferably used as a functional substance. Furthermore, the coloring material is preferably used for a recording medium, such as ink or toner.

In addition, the content of the block polymer compound in the polymer-containing composition of the present invention is 0.1 to 99% by mass, preferably 0.3 to 70% by mass, with respect to the weight of the composition of the present invention. If the content of the block polymer compound is less than 0.1% by mass, the dispersibility of the functional substance may be insufficient. If the content of the block polymer compound exceeds 99% by mass, the viscosity may substantially increase. In addition, the content of the functional substance in the composition of the present invention is in the range of 0.1% by mass or more to 80% by mass or less, preferably in the range of 0.5% by mass or more to 60% by mass or less. If the content of the functional substance is less than 0.1% by mass, the functionality of the functional substance may be insufficient. If the content of the functional substance exceeds 80% by mass, the dispersibility of the functional substance may be insufficient.

Furthermore, the polymer-containing composition of the present invention contains the solvent or dispersion medium. A binder resin may be used as the dispersion medium. The solvent or dispersion medium used may be water, an aqueous solvent, or a non-aqueous organic solvent, or a combination thereof.

Examples of the aqueous solvent include: polyhydric alcohols, such as ethylene glycol, diethylene glycol, triethylene glycol, polyethylene glycol, propylene glycol, polypropylene glycol, and glycerin; polyhydric alcohol ethers, such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents, such as N-methyl-2-pyrrolidone, substituted pyrrolidone, and triethanolamine. Further, monohydric alcohols, such as methanol, ethanol, and isopropyl alcohol, may be also used.

Examples of the non-aqueous organic solvent include: hydrocarbon-based solvents, such as hexane, heptane, octane, decane, and toluene; and solvents, such as cyclohexanone, acetone, methyl ethyl ketone, acetic acid, and butyl. Further, natural fats and oils, such as olive oil, soybean oil, beef tallow, and lard, may also be used.

Examples of the binder resin include styrene acrylic copolymers and polyesters.

The content of the solvent or dispersion medium in the polymer-containing composition of the present invention is in the range of 1% by mass or more and 99% by mass or less, preferably in the range of 10% by mass or more and 95% by mass or less. If the content of the solvent or dispersion medium is less than 1% by mass or more than 99% by mass, the dispersion of the functional substance may be insufficient.

In the polymer-containing composition of the present invention, other components may be added in addition to the components described above without any limitation, so that a UV absorber, an antioxidant, a stabilizer, or the like may be added.

The polymer-containing composition of the present invention employs the block polymer compound according to the first aspect of the present invention. Therefore, it is possible to form a high-order and sophisticated structure. It is also possible to keep properties that resemble those of a plurality of block segments of the block polymer used in the present invention in the polymer-containing composition of the present invention to make the properties of the polymer-containing composition more stable. For instance, when a dispersion solution is prepared by using the ABC triblock polymer described above, a coloring material, and water as a solvent, it is possible to favorably incorporate the coloring material into a micelle formed of the ABC block polymer. As a result, a coloring material incorporation-type ink composition can be formed. In particular, a suitable ABC triblock copolymer contains a hydrophobic segment (A), a non-ionic hydrophilic segment (B), and a hydrophilic segment (C), which contains an ionic repeating unit structure and a hydrophobic repeating unit structure that are specifically used in the present invention. Furthermore, the particle sizes of the dispersion composition particles may be extremely uniform. Furthermore, it is also possible to keep the dispersion state highly stable. It is noted that it is also possible to incorporate a coloring material by using a diblock copolymer.

The incorporation of the coloring material into a micelle formed of a block polymer means that the coloring material is incorporated into the core section of the formed micelle and is dispersed in the solution.

The state of the coloring material incorporated into the micelle, for example, is formed by dissolving or dispersing a coloring material in a water-insoluble organic solvent using a dispersing machine or the like, incorporating the mixture into a micelle formed of a block copolymer in water, and distilling off the organic solvent.

In addition, the incorporation state may be formed by a phase transfer from a state in which a polymer and a coloring material are dissolved in an organic solvent into an aqueous solvent and then distilling the remaining organic solvent. Alternatively, the incorporation state may be formed by a phase transfer of a state in which a polymer is dissolved in an organic solvent and a coloring material is dispersed therein into an aqueous solvent. The incorporation state can be identified through instrumental analysis, such as instrumental analysis with various electron microscopes or by X-ray diffraction. In addition, in the case of including in a micelle state, the incorporation state can be indirectly identified by independently separating the coloring material and the polymer from the solvent under the micelle-decaying conditions.

In the present invention, it is preferable for 90% or more of the functional substance to be incorporated in the micelle.

Furthermore, an ink composition, which is one preferred embodiment of the present invention, is described below.

The content of the block polymer compound of the present invention in the ink composition of the present invention is in the range of 0.1% by mass or more and 90% by mass or less, preferably in the range of 0.3% by mass or more and 80% by mass or less. In the present invention, the ink composition is preferably used as ink-jet printer ink, and 0.3 to 30% by mass of the block polymer can be used.

Next, components other than the block polymer compound in the ink composition of the present invention are described below. The other components include water, an aqueous solvent, a coloring material, and an additive. Examples of those additional components correspond to those described above.

The coloring materials typically include pigments and dyes. The pigment may be an organic pigment or an inorganic pigment. The pigments, which can be used in ink, are preferably a black pigment and three primary color pigments of cyan, magenta, and yellow. A color pigment, except for those described above, a colorless or light color pigment, or a metallic pigment may be used. In addition, in the present invention, the pigment may be one that is commercially available or that is newly synthesized. In addition, the pigment may be used together with a dye.

Hereinafter, commercially available black, cyan, magenta, and yellow pigments are exemplified.

Examples of the black pigments include, but are not limited to, Raven 1060 (manufactured by Columbian Chemicals Co.), MOGUL-L (manufactured by Cabot Corporation), Color Black FW1 (manufactured by Degussa Corporation), and MA100 (manufactured by Mitsubishi Chemical Corporation).

Examples of the cyan pigments include, but are not limited to, C.I. Pigment Blue-15:3, C.I. Pigment Blue-15:4, and C.I. Pigment Blue-16.

Examples of the magenta pigments include, but are not limited to, C.I. Pigment Red-122, C.I. Pigment Red-123, and C.I. Pigment Red-146.

Examples of the yellow pigments include, but are not limited to, C.I. Pigment Yellow-74, C.I. Pigment Yellow-128, and C.I. Pigment Yellow-129.

Furthermore, in the ink composition of the present invention, a pigment that is self-dispersible in water can be also used. The water-dispersible pigments include a pigment, which has a polymer adsorbed on the surface thereof and utilizes steric hindrance effects and a pigment that utilizes electrostatic repulsion. Examples of such commercially available pigments include CAB-O-JET200 and CAB-0-JET300 (manufactured by Cabot Co., Ltd.), and Microjet Black CW-1 (Orient Chemical Industries, LTD.).

The content of the pigment in the ink composition of the present invention is preferably in the range of 0.1 to 50% by mass with respect to the total mass of the ink composition. If the content of the pigment is less than 0.1% by mass, a sufficient ink density cannot be obtained. If the content of the pigment exceeds 50% by mass, the pigment is hardly dispersed because of the agglomeration of the pigment. Furthermore, the content of the pigment is more preferably in the range of 0.5 to 30% by mass.

The ink composition of the present invention may use a dye. The dyes include a direct dye, an acid dye, a basic dye, a reactive dye, a water-soluble dye of a food coloring matter, and a dispersion dye of an insoluble coloring matter.

Examples of the water soluble dyes include: direct dyes, such as C.I. Direct Black, −17, −62, and −154, C.I. Direct Yellow, −12, −87, and −142, C.I. Direct Red, −1, −62, and −243, C.I. Direct Blue, −6, −78, and −199, C.I. Direct Orange −34 and −60, C.I. Direct Violet, −47 and −48, C.I. Direct Blown, −109, and C.I. Direct Green, −59;

acid dyes, such as C.I. Acid Black, −2, −52, and 208, C.I. Acid Yellow, −11, −29, and −71, C.I. Acid Red, −1, −52, and −317, C.I. Acid Blue, −9, −93, and −254, C.I. Acid Orange, −7 and −19, and C.I. Acid Violet, −49;

reactive dyes, such as C.I. Reactive Black, −1, −23, and −39, Reactive Yellow, −2, −77, and −163, C.I. Reactive Red, −3, −111, and −221, C.I. Reactive Blue, −2, −101, and −217, C.I. Reactive Orange, −5, −74, and −99, C.I. Reactive Violet, −1, −24, and −38, C.I. Reactive Green, −5, −15, and −23, and C.I. Reactive Blown, −2, −18, and −33;

C.I. Basic Black, −2; C.I. Basic Red −1, −12, and −27, C.I. Basic Blue −1 and −24, C.I. Basic Violet −7, −14, and −27, and C.I. Food Black, −1 and −2.

Further, examples of commercially available oil-soluble dyes for the respective colors are described below.

Examples of the black oil-soluble dyes include, but are not limited to, C.I. Solvent Black −3, −22:1, and −50. Examples of the yellow oil-soluble dyes include, but are not limited to, C.I. Solvent Yellow −1, −25:1, and −172. Examples of the orange oil-soluble dyes include, but are not limited to, C.I. Solvent Orange −1, −40:1, and −99. Examples of the red oil-soluble dyes include, but are not limited to, C.I. Solvent Red −1, −111, and −229. Examples of the violet oil-soluble dyes include, but are not limited to, C.I. Solvent Violet −2, −11, and −47. Examples of the blue oil-soluble dyes include, but are not limited to, C.I. Solvent Blue −2, −43, and −134. Examples of the green oil-soluble dyes include, but are not limited to, C.I. Solvent Green −1, −20, and −33. Examples of the blown oil-soluble dyes include, but are not limited to, C.I. Solvent Blown −1, −20, and −58.

The content of the dye used in the ink composition of the present invention is preferably 0.1 to 50% by mass with respect to the total mass of the ink composition. The above examples of the coloring materials are preferable for the ink composition of the present invention. However, the coloring materials to be used in the ink composition of the present invention are not specifically limited to the coloring materials described above.

The solvent used may be any of water, an aqueous solvent, and an organic solvent. Of those, however, water is preferably used. Water may be ion-exchanged water, pure water, or ultra-pure water, from which metal ions and the like are removed.

The content of water in the ink composition of the present invention is preferably 1 to 95% by mass, more preferably 5% by mass or more, but less than 90% by mass. Within the range of 1 to 95% by mass, the effect of dispersion is more apparent and a more uniform dispersion state of the functional substance can be realized.

Example of the aqueous solvent include: polyhydric alcohols, such as ethylene glycol, diethylene glycol, triethylene glycol, polyethylene glycol, propylene glycol, polypropylene glycol, and glycerin; polyhydric alcohol ethers, such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents such as N-methyl-2-pyrrolidone, substituted pyrrolidone, and triethanolamine. Further, in some applications of ink, monohydric alcohols, such as methanol, ethanol, and isopropyl alcohol may be used in order to elevate desiccation on paper (recording medium).

The content of the aqueous solvent in the ink composition of the present invention is preferably in the range of 0.1 to 50% by mass, more preferably from 0.5% to 40% by mass. In the range of 0.1 to 50% by mass, the wetting effect is more pronounced, so that a more uniform dispersion state of the functional substance can be achieved.

The ink composition may be made responsive to a stimulus. The responsiveness to a stimulus allows an increase in viscosity of ink to impart favorable fixing ability by providing a stimulus during the process of image formation. The stimulus may be a temperature change, exposure to electromagnetic waves, a change in pH, a change in concentration, or the like, which may be selected or combined appropriately for the formation of an image.

The exemplified usage of the ink-jet ink of the present invention is described below.

Preparation Process for Ink-Jet Ink

As a process for preparing an ink-jet ink composition of the present invention, it is possible to exemplify a process of adding a pigment, the block polymer compound of the present invention, an additive, and so on to ion-exchanged water; dispersing these components together in the ion-exchanged water using a dispersing machine; removing coarse particles from the mixture using a centrifugal separator or the like; and then adding water or a solvent and an additive or the like, followed by stirring, mixing, and filtration.

Examples of the dispersing machine include an ultrasonic homogenizer, laboratory homogenizer, colloid mill, jet mill, and ball mill, which may be used alone or in combination.

When the self-dispersible pigment is used, the ink composition can be prepared in the same way as described above.

Next, a liquid-applying method of the present invention is described.

Liquid-Applying Method

One preferred embodiment of a method of applying the ink composition of the present invention is a liquid-applying method in which the recording is made by discharging ink from an ink-discharging part and applying the ink on a recording medium. It is preferable to use a method of forming a certain pattern on a recording medium, various printing methods by which images and characters are formed on recording media, and various image-forming methods, such as an inkjet method and an electrophotographic method. It is particularly preferable to use the ink-jet method.

The ink-jet method used may be a well-known method, such as a piezo-ink-jet system using a piezo-electric element, or a Bubble Jet (registered trademark) method in which thermal energy is used to generate an air bubble to carry out the recording. The method may be either of a continuous type or an on-demand type. In addition, the ink composition of the present invention can be used for a recording method in which ink is printed on an intermediate transfer member, and an image is then transferred on a final recording medium, such as paper.

Next, the configuration of the image-forming apparatus is described.

(Liquid-Applying Apparatus)

The ink composition of the present invention can be used in a liquid-applying apparatus using the liquid-applying method described above, a pattern-forming apparatus utilizing a pattern-forming method by which a certain pattern is formed on a recording medium, and an image-forming apparatus utilizing various printing methods of forming images and characters on recording media and various kinds of image-forming methods, such as an inkjet method and an electrophotographic method. Particularly, it is preferable to use the ink composition of the present invention in the ink-jet recording apparatus.

The ink-jet recording apparatus using the ink-jet ink of the present invention includes an ink-jet recording apparatus utilizing a piezo-ink-jet method using a piezo-electric element or a Bubble Jet (registered trademark) method in which an air bubble is generated using thermal energy to carry out the recording.

FIG. 1 shows a schematic functional diagram of an ink-jet recording apparatus. Reference numeral 50 denotes a central processing unit (CPU) of the ink-jet recording apparatus 20. A program for controlling the CPU 50 may be stored in a program memory 66 or may be stored as the so-called firmware in a memory means, such as an EEPROM (not shown). The ink-jet recording apparatus receives recording data in its program memory 66 from a recording date making means (not shown, a computer or the like). The recording data may include information about an image or character to be recorded or a compressed form thereof, or encoded information. For processing the compressed or encoded information, the CPU 50 may expand or extend the compressed or encoded information to obtain information about an image or character to be recorded. An X-encoder 62 (e.g., with respect to the X direction or the main-scanning direction) and a Y-encoder 64 (e.g., with respect to the Y direction or the sub-scanning direction) may be provided to inform the CPU 50 of a relative position of a head to the recording medium.

The CPU 50 transmits a signal for recording an image to an X-motor drive circuit 52, a Y-motor drive circuit 54, and a head drive circuit 60 on the basis of information from the program memory 66, X-encoder 62, and Y-encoder 64. The X-motor drive circuit 52 actuates an X-direction drive motor 56 and the Y-motor drive circuit 54 actuates a Y-direction drive motor 58. Thus, a head 70 is moved relative to the recording medium to shift its position to a recording position. When the head 70 arrives at the recording position, the head drive circuit 60 sends to the head 70, a signal for discharging various ink compositions (Y, M, C, and K) or discharging a stimulus-imparting substance to act as a stimulus, to carry out recording. The head 70 may be designed to discharge a mono-color ink composition or to discharge two or more ink compositions, or may be designed to have an additional function of discharging a stimulus-imparting substance to act as a stimulus.

Hereinafter, the present invention is described with reference to the examples. However, the present invention is not limited to these examples.

Example 1

Synthesis 1 of Block Polymer

Synthesis of a block polymer composed of isobutyl vinylether (IBVE: A block) and 4-(2-vinyloxy)ethoxy ethyl benzoate (VEOEtPhCOOEt: B block)

After a nitrogen substitution of the inside of a glass container attached with a three-way cock had been carried out, the container was heated to 250° C. under nitrogen gas atmosphere to remove adsorbed water. After the reaction system had been cooled down to room temperature, 12 mmol of IBVE, 16 mmol of ethyl acetate, 0.05 mmol of 1-isobutoxyethyl acetate, and 11 ml of toluene were added and then the reaction system was cooled down. When the system temperature reached 0° C., 0.2 mmol of ethyl aluminum sesquichloride (equimolar mixture of diethyl aluminum chloride and ethyl aluminum dichloride) was added to initiate polymerization. The molecular weight of the product was monitored with time-sharing through molecular sieve column chromatography (GPC) to confirm the completion of polymerization of the A block.

Next, a solution of 10 mmol of VEOEtPhCOOEt:B block in 13 ml of toluene was added to continue the polymerization. After 20 hours, the polymerization reaction was discontinued. The discontinuance of the polymerization reaction was carried out by the addition of 0.3% by mass of an aqueous ammonium/methanol solution to the reaction mixture. Then, the reaction mixture solution was diluted with dichloromethane and washed with 0.6-M hydrochloric acid three times, followed by washing with distilled water three times. The resulting organic phase was concentrated and dried through an evaporator and then dried under vacuum. The product was subjected to dialysis in a methanol solvent through a semi-permeable cellulose membrane and then the dialysis was repeated to remove a monomer compound, thereby obtaining a diblock polymer as a target product. The resulting compound was subjected to identification using NMR and GPC. Consequently, Mn=21,500 and Mw/Mn=1.38 were obtained. The polymerization ratio A:B=200:28 was also obtained.

The resulting block polymer was hydrolyzed in a mixture of methanol and aqueous sodium hydroxide for 10 hours. As a result, 48 mol % of a C block component was hydrolyzed, thereby obtaining a sodium chloride triblock polymer. In this case, 48 mol % of the C block component was carboxylate and hydrophilic and the rest (52 mol %) of the C block component remained as an ester, a hydrophobic group. The compounds were subjected to identification using NMR and GPC, respectively.

Furthermore, the aqueous dispersion was neutralized with 0.1 N hydrochloric acid, thereby obtaining a triblock polymer in which a carboxylate portion became a free carboxylic acid. The compounds were subjected to identification using NMR and GPC, respectively.

Synthesis 2 of Block Polymer

Synthesis of a triblock polymer composed of isobutyl vinylether, $CH_2=CHOCH_2CH_2OPhPh$: (IBVE-r-VEEtPhPH: A block), 2-methoxyethyl vinyl ether (MOVE: B block), 4-(2-vinyloxy)ethyl benzoate, and isobutyl vinyl ether (C block)

After a nitrogen substitution of the inside of a glass container attached with a three-way cock had been carried out, the container was heated to 250° C. under nitrogen gas atmosphere to remove adsorbed water. After the reaction system had been cooled down to room temperature, 6 mmol of IBVE, 6 mmol of VEEtPhPh, 16 mmol of ethyl acetate, 0.1 mmol of 1-isobutoxyethyl acetate, and 11 ml of toluene were added and then the reaction system was cooled down. When the system temperature reached 0° C., 0.2 mmol of ethyl aluminum sesquichloride (equimolar mixture of diethyl aluminum chloride and ethyl aluminum dichloride) was added to initiate polymerization. The molecular weight of the product was monitored with time-sharing through molecular sieve column chromatography (GPC) to confirm the completion of polymerization of the A block.

Next, 24 mmol of EOVE of the B block was added to continue the polymerization. After the completion of polymerization of the B block had been confirmed by monitoring with GPC, a solution of 10 mmol of C block component (Component ratio=1:1/mol ratio) in toluene was added to continue the polymerization. After 20 hours, the polymerization reaction was discontinued. The discontinuance of the polymerization reaction was carried out by the addition of 0.3% by mass of an aqueous ammonium/methanol solution to the reaction system. The reaction mixture solution was diluted with dichloromethane, washed with 0.6 M hydrochloric acid three times, and then washed with distilled water three times. The resulting organic phase was concentrated and dried through an evaporator and then dried under vacuum. The product was subjected to dialysis in a methanol solvent through a semi-permeable membrane of cellulose and then the dialysis was repeated to remove a monomer compound, thereby obtaining a triblock polymer as a target product. The resulting compound was subjected to identification using NMR and GPC. Consequently, Mn=38,300 and Mw/Mn=1.34 were obtained. The polymerization ratio A:B:C=100:200:30 was also obtained. The polymerization ratio of two monomers in the A block was 1:1. In addition, the polymerization ratio of two monomers in the C block was 1:1.

The resulting block polymer was hydrolyzed in a mixture of dimethylformamide and aqueous sodium hydroxide. As a result, 100 mol % of a C block component was hydrolyzed, thereby obtaining a sodium chloride triblock polymer. The compound was subjected to identification using NMR and GPC, respectively.

Furthermore, the aqueous dispersion was neutralized with 0.1 N hydrochloric acid, thereby obtaining a triblock polymer in which the C block component portion became a free carboxylic acid. The chemical compound was subjected to identification with NMR and GPC, respectively.

Synthesis 3 of Block Polymer

The ester-type block copolymer synthesized in Synthesis 1 was hydrolyzed for 30 hours and then subjected to the same post processing as that in Synthesis 1, resulting in a block copolymer with a hydrolysis ratio of 88 mol %. The resulting compound was subjected to identification using NMR and GPC.

Synthesis 4 of Block Polymer

The mole ratio between 4-(2-vinyloxy)ethoxy ethyl benzoate and isobutyl vinyl ether in the C block segment of the block copolymer synthesized in Synthesis 2 was changed to 85:15, and then polymerization, post-processing, and hydrolysis were carried out in the same ways as those in Synthesis 2, thereby obtaining a block polymer.

Synthesis 5 of Block Polymer

Isobutyl vinyl ether of the C block segment of the block copolymer synthesized in Synthesis 4 was replaced with 2-(4-methylphenyloxy)ethyl-1-vinyl ether and then polymerization, post-processing, and hydrolysis were carried out in the same way as in Synthesis 4, thereby obtaining a block polymer.

Synthesis 6 of Block Polymer

The mole ratio between 4-(2-vinyloxy)ethoxy ethyl benzoate and 2-(4-methylphenyloxy)ethyl-1-vinyl ether in the C block segment of the block copolymer synthesized in Synthesis 5 was changed to 91:9, and then polymerization, post-processing, and hydrolysis were carried out in the same way as in Synthesis 5, thereby obtaining a block polymer.

Example 2

15 parts by mass of the carboxylate-type block polymer obtained in Synthesis 1 of Example 1 and 7 parts by mass of Oil Blue-N(C.I. Solvent Blue-14, manufactured by Aldrich Corporation) were dissolved together in 150 parts by mass of dimethylformamide, followed by conversion to an aqueous phase using 400 parts by mass of distilled water, thereby obtaining an ink composition. After the ink composition had been left to stand for 10 days at room temperature, there was no isolation and sedimentation of oil blue.

Example 3

15 parts by mass of the carboxylate-type block polymer obtained in Synthesis 2 of Example 1 and 7 parts by mass of a black pigment manufactured by Cabot Ltd. were mixed with 150 parts by mass of dimethylformamide, followed by conversion to an aqueous phase using 600 parts by mass of distilled water, thereby obtaining an ink composition. Then, the resulting ink composition was filtrated through a membrane filter to remove coarse particles of 2 μm in particle size. The viscosity of the final ink composition was 0.004 Pa·s (4 cps, 20° C.). After the ink composition had been left to stand for 10 days at room temperature, there was no isolation and sedimentation of oil blue.

Example 4

The ink prepared in Example 2 was filled in a print head of an inkjet printer (trade name: BJF800, manufactured by Canon Inc.) to carry out overall printing on a 3 cm×3 cm square. As a result, favorable printing was attained without causing any thin spots. Three minutes after the recording was made, a printed portion was strongly rubbed with a line marker three times. However, there no blue tailing was observed. This result showed that the ink composition had an excellent fixing ability.

Example 5

The ink prepared in Example 3 was filled in a print head of an inkjet printer (trade name: BJF800, manufactured by Canon Inc.) to carry out overall positive printing on a 3 cm×3 cm square. As a result, favorable printing was attained without causing any thin spot. Three minutes after the recording was made, a printed portion was strongly rubbed with a line marker three times. However, no black tailing was observed. The result showed that the ink composition had an excellent fixing ability.

Comparative Example 1

A block copolymer (number average molecular weight 15,000, Mw/Mn=1.3) of polystyrene:polyethylene glycol=1:1 was used instead of the block polymer of Example 3 in accordance with the present invention to prepare a pigment-dispersed ink in the same way as in Example 3. Then, the prepared ink was filled in a print head of an inkjet printer (trade name: BJF800, manufactured by Canon Inc.) to carry out overall positive printing on a 3 cm×3 cm square. As a result, the recorded product was blurred in a line shape and the overall printing could not be carried out.

Comparative Example 2

A block copolymer (number average molecular weight 12,000, Mw/Mn=1.3) of polystyrene:sodium acrylate=1:1 was used instead of the block polymer of Example 3 in accordance with the present invention to prepare a pigment-dispersed ink by the same way as that of Example 3. Then, the prepared ink was filled in a print head of an inkjet printer (trade name: BJF800, manufactured by Canon Inc.) to carry out overall positive printing on a 3 cm×3 cm square. As a result, the recorded product was blurred on the whole surface, and the periphery of the square was recorded insufficiently with three rounded-off angles of the square.

Example 6

In Synthesis 1 of the block copolymer of Example 1, the monomer of the A block segment was replaced with 2-ethoxyethoxyvinylether (EOVE) and then a carboxylate-type triblock polymer was synthesized in the same way as in Example 1. Then, similar to Example 3, 15 parts by mass of the synthesized carboxylate-type triblock polymer and 5 parts by mass of Oil Blue-N (C. I. Solvent Blue-14, manufactured by Aldrich Cooperation) were dissolved together in 150 parts by mass of dimethylformamide, and subsequently, the solution was converted to an aqueous phase using 400 parts by mass of distilled water, thereby obtaining an ink composition. After the ink composition had been left to stand for 10 days at room temperature, there was no isolation and sedimentation of oil blue. Furthermore, the dispersed composition was filled in a print head of an inkjet printer (trade name: BJF800, manufactured by Canon Inc.) in the same way as in Example 4 to carry out overall positive printing on a 3 cm×3 cm square. As a result, favorable printing was attained without causing any thin spots.

Three minutes after the recording was made, a printed portion was strongly rubbed with a line marker three times. However, no blue was observed. The result showed that the ink composition had an excellent fixing ability. In addition, independently, the dispersed composition was cooled to 0° C., and an EOVE polymerization segment as a hydrophobic segment was converted into a hydrophilic one. Then, the polymer was subjected to molecular dissolution in a solvent, resulting in elution of oil blue from the dispersed composition. The visible light absorbance spectrum of the resulting filtrate was measured. A comparison with the absorbance obtained before cooling showed that 99.5% or more of the oil blue was eluted. This showed that 99.5% or more of oil blue was incorporated in the polymer.

Example 7

In a manner similar to Example 2, pigment-incorporated inks were prepared using a copper cyanophthalocyanine pigment (manufactured by Toyo Ink Mfg. Co., Ltd.) and also using the polymers of Syntheses 1 to 6 of Example 1. Inks were prepared using the above cyan pigment and the polymers employed in Comparative Examples 1 and 2. Each of these inks prepared using the polymers of Syntheses 1 to 6 of Example 1 and the polymers of Comparative Examples 1 and 2 was filled in a print head of an inkjet printer (trade name: BJF800, manufactured by Canon Inc.) and recorded on a 3 cm×3 cm square, followed by being subjected to an optical density (OD) measurement with an optical densitometer manufactured by Sakata Ink Corporation. The measured optical densities of the pigment-incorporated inks using the polymers of Syntheses 1 to 6 of Example 1 and the polymers of Comparative Examples 1 and 2 were, in that order, 0.76, 0.76, 0.86, 0.74, 0.91, 0.93, 0.34, and 0.42.

This application claims priority from Japanese Patent Application No. 2003-345828 filed on Oct. 3, 2003, which is hereby incorporated by reference herein.

The invention claimed is:

1. A block polymer compound comprising block segments, wherein at least one hydrophilic block segment among the block segments is a copolymer segment composed of an ionic repeating unit structure and a hydrophobic repeating unit structure, and
wherein, in the hydrophilic block segment, the ionic repeating unit structure is obtained by forming into a sodium salt a repeating unit structure obtained from 4-(2-vinyloxy)ethoxy ethyl benzoate, the hydrophobic repeating unit is obtained from 2-(4-methylphenyloxy)ethyl-1-vinyl ether, and a content of 4-(2-vinyloxy)ethoxy ethyl benzoate is 91 mol % and a content of 2-(4-methylphenyloxy)ethyl-1-vinyl ether is 9 mol %.

2. A polymer-containing composition comprising:
the block copolymer compound according to claim 1;
a solvent or a dispersion medium; and
a functional substance.

3. A polymer-containing composition according to claim 2, wherein the functional substance is a coloring material incorporated in the block polymer compound.

4. An image-forming method comprising applying an ink containing the composition according to claim 2 on a recording medium to carry out recording.

* * * * *